(12) United States Patent
Jeon et al.

(10) Patent No.: US 9,770,885 B2
(45) Date of Patent: Sep. 26, 2017

(54) OUTER SKIN MATERIAL FOR VACUUM HEAT INSULATOR INCLUDING GLASS FIBER AND VACUUM HEAT INSULATOR INCLUDING THE SAME

(71) Applicant: LG Hausys, Ltd., Seoul (KR)

(72) Inventors: Seung Min Jeon, Busan (KR); Sung Seock Hwang, Cheongju-si (KR); Jung Pil Han, Ulsan (KR); Byung Hoon Min, Ulsan (KR)

(73) Assignee: LG HAUSYS, LTD., Seoul (KR)

( * ) Notice: Subject to any disclaimer, the term of this patent is extended or adjusted under 35 U.S.C. 154(b) by 7 days.

(21) Appl. No.: 14/774,696

(22) PCT Filed: Feb. 6, 2014

(86) PCT No.: PCT/KR2014/001033
§ 371 (c)(1),
(2) Date: Sep. 10, 2015

(87) PCT Pub. No.: WO2014/142441
PCT Pub. Date: Sep. 18, 2014

(65) Prior Publication Data
US 2016/0016380 A1    Jan. 21, 2016

(30) Foreign Application Priority Data

Mar. 12, 2013    (KR) .................. 10-2013-0026187

(51) Int. Cl.
*F16L 59/065* (2006.01)
*B32B 5/22* (2006.01)
(Continued)

(52) U.S. Cl.
CPC .................. *B32B 5/22* (2013.01); *B32B 7/12* (2013.01); *B32B 15/08* (2013.01); *B32B 15/14* (2013.01);
(Continued)

(58) Field of Classification Search
CPC ..... Y10T 428/231; F16L 59/065; E04B 1/803
See application file for complete search history.

(56) References Cited

U.S. PATENT DOCUMENTS 4,963,636 A * 10/1990 Mulhaupt ............. C07F 7/1836
528/28
6,322,720 B1 * 11/2001 Reutova .................. B22F 9/20
252/181.6
(Continued)

FOREIGN PATENT DOCUMENTS

CN           1183416        6/1998
CN         101397395 A      4/2009
(Continued)

OTHER PUBLICATIONS

Machine translation of JP 2003-154534 retrieved Jan. 7, 2016.*
(Continued)

*Primary Examiner* — Alexander Thomas
(74) *Attorney, Agent, or Firm* — Hauptman Ham, LLP (57) ABSTRACT

The present invention provides an outer skin material for a vacuum heat insulator including: a lamination structure of an outermost glass textile layer, a surface protective layer, and an adhesive layer from the outside. In addition, the present invention provides a vacuum heat insulator including: a glass fiber board including 50 wt % to 90 wt % of fumed silica powder and 10 wt % to 50 wt % of glass fiber; and the outer skin material for a vacuum heat insulator, the outer skin material having the glass fiber board inserted therein. Further, the present invention provides a vacuum heat insulator including: a glass fiber board having at least one layer and including 85 wt % to 100 wt % of glass fiber; a getter agent attached to or inserted in the glass fiber board; and the outer skin material described in claim 1, the outer skin material having the glass fiber board inserted therein.

17 Claims, 6 Drawing Sheets

(51) Int. Cl.

| | | |
|---|---|---|
| *B32B 15/14* | (2006.01) | |
| *B32B 7/12* | (2006.01) | |
| *B32B 15/08* | (2006.01) | |
| *B32B 15/20* | (2006.01) | |
| *B32B 27/34* | (2006.01) | |
| *B32B 27/36* | (2006.01) | |
| *B32B 17/02* | (2006.01) | |
| *B32B 17/06* | (2006.01) | |

(52) U.S. Cl.
CPC .............. *B32B 15/20* (2013.01); *B32B 17/02* (2013.01); *B32B 17/061* (2013.01); *B32B 27/34* (2013.01); *B32B 27/36* (2013.01); *F16L 59/065* (2013.01); *B32B 2255/10* (2013.01); *B32B 2255/26* (2013.01); *B32B 2262/101* (2013.01); *B32B 2264/102* (2013.01); *B32B 2307/304* (2013.01); *B32B 2307/3065* (2013.01)

(56) References Cited

U.S. PATENT DOCUMENTS

| | | | |
|---|---|---|---|
| 2005/0053755 A1* | 3/2005 | Markey | B32B 3/18 428/69 |
| 2010/0041976 A1 | 2/2010 | Gore et al. | |
| 2012/0164365 A1 | 6/2012 | Jang et al. | |
| 2013/0142983 A1* | 6/2013 | Han | B32B 5/26 428/69 |

FOREIGN PATENT DOCUMENTS

| | | | |
|---|---|---|---|
| CN | 102652061 A | | 8/2012 |
| CN | 202388864 U | | 8/2012 |
| CN | 102748560 A | | 10/2012 |
| JP | 2003154534 A | | 5/2003 |
| JP | 2005171044 A | * | 6/2005 |
| JP | 2013-508652 A | | 3/2013 |
| JP | 2013-540607 A | | 11/2013 |
| KR | 1995-0006938 B1 | | 6/1995 |
| KR | 10-2001-0005780 A | | 1/2001 |
| KR | 1020050031360 A | | 4/2005 |
| KR | 1020080014644 A | | 2/2008 |
| KR | 1020120016743 A | | 2/2012 |
| WO | 2006131692 A1 | | 12/2006 |
| WO | 2012023705 A2 | | 2/2012 |
| WO | 2012044001 A2 | | 4/2012 |

OTHER PUBLICATIONS

Machine translation of JP2005171044A, retrieved Mar. 8, 2017.*
Machine translation of CN202388864, retrieved Mar. 7, 2017.*
European Search Report mailed on Jan. 27, 2016 corresponding to European Patent Application No. 14765626.8.
Chinese Office Action issued on Jun. 2, 2016 corresponding to Chinese Application No. 201480015492.
International Search Report for PCT/KR2014/001033 mailed on May 13, 2014.
Chinese Office Action issued on Jan. 22, 2017 for Chinese Application No. 201480015492.
Japanese Office Action mailed on Dec. 13, 2016 for Japanese Application No. 2015-562900.
Korean Office Action issued on Mar. 31, 2017 for Korean Application No. 10-2013-0026187.

* cited by examiner

OUTER SKIN MATERIAL FOR VACUUM HEAT INSULATOR INCLUDING GLASS FIBER AND VACUUM HEAT INSULATOR INCLUDING THE SAME

CROSS REFERENCE TO RELATED APPLICATION

This application claims the priority of Korean Patent Application No. 10-2013-0026187, filed Mar. 12, 2013 in the KIPO (Korean Intellectual Property Office). Further, this application is the National Phase application of International Application No. PCT/KR2014/001033 filed Feb. 6, 2014, which designates the United States and was published in Korean.

TECHNICAL FIELD

The present invention relates to an outer skin material for a vacuum heat insulator including a glass fiber, and a vacuum heat insulator including the same.

BACKGROUND ART

In the currently commercially available vacuum heat insulator, inorganic compounds such as glass wool, fumed silica, aerogels, and the like, are used as a core material, and an outer skin material includes a welding layer made of polyethylene (PE), polypropylene (PP), and the like, as well as a nylon/PET/aluminum foil or an aluminum deposition layer. In addition, absorbents such as quicklime (calcium oxide: CaO), zeolite, silica gel, and the like, and metal powder are used as a getter agent in order to secure long-term performance of the vacuum heat insulator.

In particular, an outer skin material for a vacuum heat insulator is exposed to external impact and external environmental change, that is, change in external temperature, change in humidity, and the like, and has an influence on effects and performance of the vacuum heat insulator. Therefore, research into an outer skin material for a vacuum heat insulator has continued.

DISCLOSURE

Technical Problem

An aspect of the present invention is to provide an outer skin material for a vacuum heat insulator capable of preventing damage of a surface of the outer skin material due to external scratch, impact, tear, and the like, or preventing release of vacuum in the vacuum heat insulator due to the damage.

Another aspect of the present invention is to provide a vacuum heat insulator including the outer skin material for a vacuum heat insulator, a glass fiber board, and a getter agent.

Technical Solution

In accordance with one aspect of the present invention, an outer skin material for a vacuum heat insulator includes: a lamination structure of an outermost glass textile layer, a surface protective layer, and an adhesive layer from the outside.

A metal barrier layer may be formed over or below the surface protective layer.

The outermost glass textile layer may include a glass fiber having a diameter of about 4 μm to about 40 μm.

The glass fiber may be an electrical glass (E-glass), a chemical glass (C-glass), or an electrical-corrosion resistant glass (E-CR glass).

The outermost glass textile layer may include a glass fiber yarn formed by twisting glass filaments prepared by heat melt-spinning glass fibers, or a glass fiber fabric formed by weaving the glass fiber yarns, or a glass fiber mat formed by connecting the glass fiber fabrics through the glass fiber yarn.

The outermost glass textile layer may include a glass paper.

The outermost glass textile layer may have a fabric structure of plain weave, twill weave, satin weave, leon plain, or imitation leno.

The outermost glass textile layer may have a thickness of about 0.1 mm to about 3 mm.

The outermost glass textile layer and the surface protective layer or the outermost glass textile layer and the metal barrier layer may be adhered to each other by a polyurethane-based resin or a polyester resin.

The polyurethane-based resin or the polyester resin may include one or more selected from the group consisting of a phosphorus compound, a nitrogen compound, a boron compound, antimony trioxide, aluminum hydroxide, magnesium hydroxide, and combinations thereof.

The polyurethane-based resin or the polyester resin may include about 3 wt % to about 60 wt % of one or more selected from the group consisting of a phosphorus compound, a nitrogen compound, a boron compound, antimony trioxide, aluminum hydroxide, magnesium hydroxide, and combinations thereof.

The surface protective layer may include a lamination structure of a polyethylene terephthalate film and a nylon film.

An upper part of the polyethylene terephthalate film may be coated with a vinyl-based resin.

The vinyl-based resin may be one or more selected from the group consisting of polyvinyl chloride (PVC), polyvinyl acetate (PVA), polyvinyl alcohol (PVAL), polyvinyl butyral (PVB), polyvinylidene chloride (PVDC), and combinations thereof.

The metal barrier layer may include an aluminum foil.

The adhesive layer may be one or more selected from the group consisting of high density polyethylene (HDPE), low density polyethylene (LDPE), linear low density polyethylene (LLDPE), non-oriented cast polypropylene (CPP), oriented polypropylene (OPP), polyvinylidene chloride (PVDC), polyvinyl chloride (PVC), ethylene-vinyl acetate (EVA) copolymer, ethylene-vinyl alcohol (EVOH) copolymer, and combinations thereof.

In accordance with another aspect of the present invention, a vacuum heat insulator includes: a glass fiber board having at least one layer and including about 50 wt % to about 90 wt % of fumed silica powder and about 10 wt % to about 50 wt % of glass fiber; and the outer skin material for a vacuum heat insulator as described above, in which the glass fiber board is inserted.

The glass fiber may have a diameter of about 0.1 μm to about 20 μm.

The glass fiber board may have a pore size of about 15 μm to about 30 μm and a porosity of about 80% to about 95%.

In accordance with still another aspect of the present invention, a vacuum heat insulator includes: a glass fiber board having at least one layer and including about 85 wt % to about 100 wt % of glass fiber; a getter agent attached to or inserted in the glass fiber board; and the outer skin material for a vacuum heat insulator as described above, in which the glass fiber board is inserted therein.

The getter agent may include quicklime powder; and an alloy selected from the group consisting of Ba, Li, Zr, Co and combinations thereof, the quicklime powder having an amount of 1 wt % to 25 wt % based on total weight of the alloy.

The vacuum heat insulator may include at least one through-hole.

The through-hole may have a shape of polygons, circles, ellipses and combinations thereof.

Advantageous Effects

Barrier performance of the outer skin material for a vacuum heat insulator may be enhanced, and tear caused by external impact and flame retardancy of the surface of the outer skin material may be improved by using the outer skin material for a vacuum heat insulator according to the present invention.

In addition, initial heat insulation performance and long-term durability may be improved by using the vacuum heat insulator including the outer skin material for a vacuum heat insulator.

BEST MODE

Hereinafter, exemplary embodiments of the present invention will be described in detail. However, Examples to be described below are provided by way of example only, and the present invention is not limited to the following Examples. Therefore, the present invention will be defined only by the scope of the appended claim.

Outer Skin Material for Vacuum Heat Insulator

In an exemplary embodiment of the present invention, there is provided an outer skin material for a vacuum heat insulator includes a lamination structure of an outermost glass textile layer, a surface protective layer, and an adhesive layer from the outside. In the outer skin material for a vacuum heat insulator, a metal barrier layer may be formed over or below the surface protective layer.

Conventional outer skin materials for a vacuum heat insulator are exposed to external impact and external environmental change, that is, change in external temperature, change in humidity, and the like, and may have an influence on heat insulation effects and long-term durability of a vacuum heat insulator due to damage of the outer skin material for a vacuum heat insulator. Accordingly, the outer skin material for a vacuum heat insulator may include the outermost glass textile layer at an outermost portion to improve a problem in which vacuum is released due to damage of a surface of the outer skin material for a vacuum heat insulator, a problem in which a rapid barrier performance is deteriorated at the time of applying high temperature to the outer skin material for a vacuum heat insulator, and tear of the outer skin material caused by we construction at the time of applying the outer skin material for a vacuum heat insulator to construction, and flame retardancy of the surface of the outer skin material.

Specifically, by using the outer skin material for a vacuum heat insulator according to the present invention, barrier performance of the outer skin material for a vacuum heat insulator may be enhanced, and tear caused by external impact and flame retardancy of the surface of the outer skin material may be improved. In addition, by using the vacuum heat insulator including the outer skin material for a vacuum heat insulator, initial heat insulation performance and long-term durability may be improved.

Figure 1:
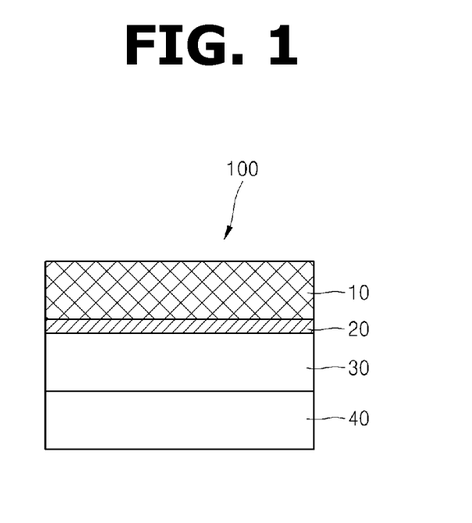
FIGS. 1 and 2 are cross-sectional views each illustrating an outer skin material for a vacuum heat insulator of an exemplary embodiment of the present invention.

FIG. 1 is a cross-sectional view illustrating an outer skin material for a vacuum heat insulator of an exemplary embodiment of the present invention. Referring to FIG. 1, the outer skin material for a vacuum heat insulator 100 may include: an outermost glass textile layer 10, a metal barrier layer 20, a surface protective layer 30, and an adhesive layer 40.

Figure 2:
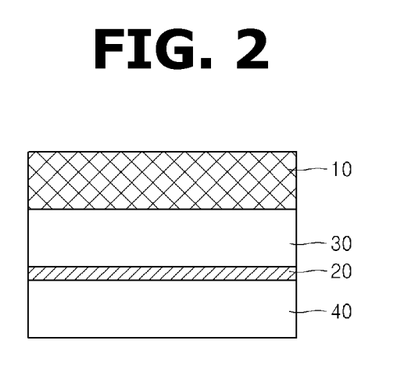

In addition, FIG. 2 is a cross-sectional view illustrating an outer skin material for a vacuum heat insulator of an exemplary embodiment of the present invention. Referring to FIG. 2, the outer skin material for a vacuum heat insulator 100 may include: an outermost glass textile layer 10, a surface protective layer 30, a metal barrier layer 20, and an adhesive layer 40.

The outermost glass textile layer 10 may include a glass fiber having a diameter of about 4 μm to about 40 μm. The glass fiber indicates a material obtained by melting and processing a glass including silicate as a main component and processing the glass in a fiber shape. The outermost glass textile layer 10 may include a glass fiber having a diameter of about 4 μm to about 40 μm to minimize a heat flow amount conducted in a horizontal direction through the outermost glass fiber layer, thereby minimizing heat loss by the vacuum heat insulator.

The glass fiber may be an electrical glass (E-glass), a chemical glass (C-glass), or an electrical-corrosion resistant glass (E-CR glass). The E-glass is a glass capable of having about 0.8% or less of alkali content, exhibiting excellent electrical properties and excellent weathering resistance, and withstanding even for long-term use, which is widely used even in a fiber reinforced plastic (FRP) field, and may be either an aluminosilicate glass containing silicon, aluminum and calcium oxides as main composition or a calcium aluminosilicate glass containing silicon, aluminum and boron oxides as main composition.

The C-glass is an alkali resistant glass having excellent acid resistance, which is mainly used for filtration of acid solution and enhancement of reinforced plastic for an acid-resistant container, and is also alkali-metal calcium glass in which silicon, sodium, potassium, and boron oxides are increased as main composition, which has excellent chemical resistance.

In addition, the E-CR glass is a glass which does not contain boron oxides in the composition of the E-glass and has excellent acid resistance.

Specifically, the glass fiber included in the outermost glass textile layer may be an E-glass, and has a small alkali content to have relatively excellent weathering resistance as compared to other glasses, such that when the outermost glass textile layer including the E-glass glass fiber is used as the outer skin material for vacuum heat insulator, the outer skin material for vacuum heat insulator may be less affected by external impact and external change.

The outermost glass textile layer may include a glass fiber yarn formed by twisting glass filaments prepared by heat melt-spinning glass fibers, or a glass fiber fabric formed by weaving the glass fiber yarns, or a glass fiber mat formed by connecting the glass fiber fabrics through the glass fiber yarn.

Conventional glass fibers are melted at a temperature of about 1600° C., and about 100 to about 4000 pattern filaments are connected by a binder to be present in a strand form. The glass fiber present in the strand form may be prepared as glass filaments by heat melt-spinning, and the glass filaments may be twisted to form a glass fiber yarn. The outermost glass textile layer may include the glass fiber yarn, and the glass fiber yarn may have a diameter of about 5 µm to about 13 µm.

A glass fiber fabric may be formed by performing a preparation process including warping the glass fiber yarn and then performing a weaving process. The outermost glass textile layer may include the glass fiber fabric, and the glass fiber fabric may have a diameter of about 11 µm to about 33 µm. In addition, a glass fiber mat may be formed by connecting the glass fiber fabrics through the glass fiber yarn, and the outermost glass textile layer may include the glass fiber mat.

Further, the outermost glass textile layer may include a glass paper. The glass paper refers to a paper coated with glass powder, the glass paper being made by mixing glass powder with other additives to form raw materials, forming a paper at an early stage from the raw materials, and performing an impregnation process for supplementing surface smoothness and mechanical properties of the formed paper, followed by a drying process of drying the paper at a predetermined temperature, to mend foreign materials or contaminated portions of the paper.

The glass paper includes glass powder of E-glass, has high tensile strength and tensile elastic modulus to have excellent dimensional stability, and is a non-combustible material, which is excellently applied to the outer skin material for a vacuum heat insulator. In addition, due to a thin thickness, it is easy to adhere the glass paper to other materials by using a binder, such that the glass paper may be easily applied to the surface protective layer or the metal barrier layer formed below the outermost glass textile layer.

Figure 3A:
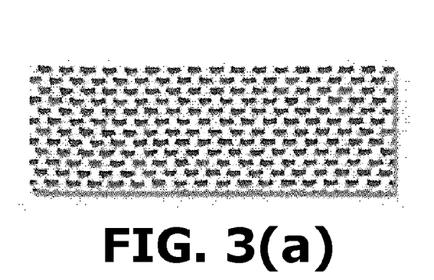
FIG. 3(a) to FIG. 3(e) illustrate fabric structures of an outermost glass textile layer included in the outer skin material for a vacuum heat insulator.
Figure 3B:
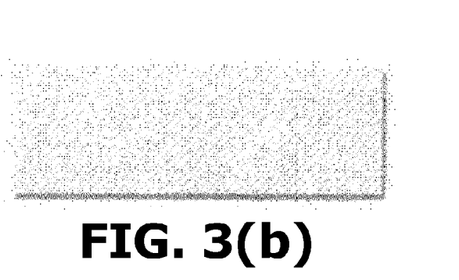
Figure 3C:
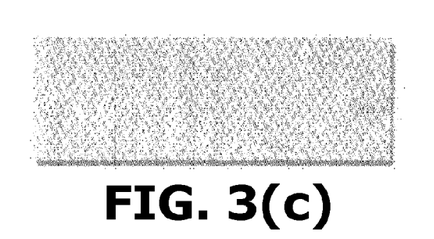
Figure 3D:
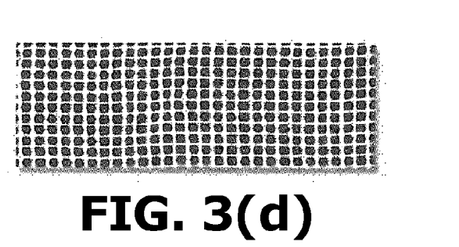
Figure 3E:
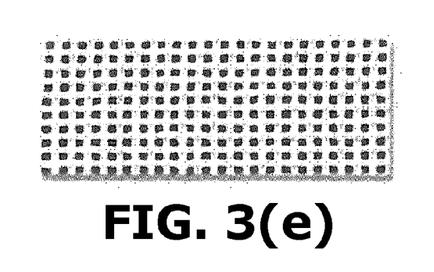

FIG. 3(a) to FIG. 3(e) illustrate fabric structures of the outermost glass textile layer included in the outer skin material for a vacuum heat insulator. FIG. 3(a) illustrates plain weave, FIG. 3(b) illustrates twill weave, FIG. 3(c) illustrates satin weave, FIG. 3(d) illustrates leon plain, and FIG. 3(e) illustrates imitation leno.

Specifically, the outermost glass textile layer may have a fabric structure such as plain weave, twill weave, satin weave, leon plain, or imitation leno. The plain weave is a tissue in which one warp yarn is crossed with one weft yarn every time, and at the time of impregnating the plain weave with a resin, defoamation may be easily performed. The twill weave has high density by using at least three warp yarns and three weft yarns, and has a diagonal form to be flexible as compared to the plain weave. The satin weave may have excellent flexibility as compared to the twill weave by disposing intersections of the warp yarn and the weft yarn at a predetermined interval, and may exhibit maximum strength by molding curved surfaces or in one direction.

The leon plain is made by combining two or more warp yarns with one weft yarn, and has a large gap, and may be washed without pushing cloth having less density of yarn. In addition, the imitation leno is made by collecting a number of threads to be used as warp yarns and weft yarns and weaving the yarns like a plain weave.

The outermost glass textile layer may have a thickness of about 0.1 mm to about 3 mm. By maintaining the thickness of the outermost glass textile layer at the above-described range, external impact and impact due to scratch, flame propagation, and the like, applied to the outer skin material for a vacuum heat insulator may be minimized, and release of vacuum in the vacuum heat insulator caused by damage of the outer skin material for a vacuum heat insulator may be prevented.

By using the outermost glass textile layer at an outermost portion of the outer skin material for a vacuum heat insulator, flame propagation velocity may be low due to non-combustible property of the glass fiber included in the glass textile layer, and a self-extinguishing property in which fire is spontaneously extinguished and a property of buffering heat source applied to a surface of the outer skin material under high temperature condition may be obtained.

The outermost glass textile layer and the surface protective layer or the outermost glass textile layer and the metal barrier layer may be adhered to each other by a polyurethane-based resin or a polyester resin. These adhesions are to further improve sealing property of the outer skin material for a vacuum heat insulator.

The polyurethane-based resin or the polyester resin may include one or more selected from the group consisting of a phosphorus compound, a nitrogen compound, a boron compound, antimony trioxide, aluminum hydroxide, magnesium hydroxide, and combinations thereof. By including flame retardant materials in the polyurethane-based resin or the polyester resin, heat resistance and flame retardancy of the outer skin material for a vacuum heat insulator may be provided, and even at the time of using the outer skin material for high temperature usage, vacuum retentivity in the vacuum heat insulator according to deterioration of the outer skin material may be improved.

Specifically, the polyurethane-based resin or the polyester resin may include about 3 wt % to about 60 wt % of one or more selected from the group consisting of a phosphorus compound, a nitrogen compound, a boron compound, antimony trioxide, aluminum hydroxide, magnesium hydroxide, and combinations thereof. By including the flame retardant materials at the above-described range, flame retardancy effect may be implemented while simultaneously securing adhesive property, and a propagation velocity of flame delivered through the adhesive layer at the time propagating the flame to the vacuum heat insulator may be reduced.

For example, the phosphorus compound and the nitrogen compound are simultaneously used, wherein about 0 wt % to about 30 wt % of the phosphorus compound and about 0 wt % to about 30 wt % of the nitrogen compound may be used, and for easiness of adhesion, about 40 wt % to about 100 wt % of organic solvent may be added to the polyurethane-based resin or the polyester resin.

The surface protective layer 30 is a layer formed below the outermost glass textile layer 10. When the metal barrier layer is formed over the surface protective layer, the surface protective layer 30 may serve to increase flame retardancy, and when the metal barrier layer is formed below the surface protective layer, the surface protective layer 30 may serve to increase a barrier property of the outer skin material for a vacuum heat insulator itself.

The surface protective layer 30 may include a lamination structure of a polyethylene terephthalate film and a nylon film. Specifically, the surface protective layer may be formed in a lamination structure of the polyethylene terephthalate film (PET) 410 having a thickness of about 10 µm to about 25 µm and the nylon film 420 having a thickness of about 15 µm to about 25 µm.

For example, when the metal barrier layer 20 is formed below the surface protective layer 30, degree of crack occurred in the metal barrier layer 20 may be significant, which may damage the polyethylene terephthalate/nylon film. In order to prevent the damage, an upper part of the polyethylene terephthalate film may be coated with a vinyl-based resin.

Specifically, the vinyl-based resin may be one or more selected from the group consisting of polyvinyl chloride (PVC), polyvinyl acetate (PVA), polyvinyl alcohol (PVAL), polyvinyl butyral (PVB), polyvinylidene chloride (PVDC), and combinations thereof.

Next, the outer skin material for a vacuum heat insulator may include the metal barrier layer 20 over the adhesive layer 40 or over the surface protective layer 30 in order to block gas and protect a core material. Specifically, the metal barrier layer may be a metal thin film having a thickness of about 5 µm to about 10 µm. A thin film having more excellent properties than those of aluminum foil has not been clearly found yet, and accordingly, the metal barrier layer 20 made of aluminum foil has been the most widely used. In addition, since the metal barrier layer includes aluminum which is a metallic material, crack may occur when being folded. In order to prevent the crack, the surface protective layer may be formed over the metal barrier layer.

Further, the adhesive layer 40, which is a layer heat welded by heat sealing, has a function of maintaining a vacuum state. The adhesive layer 40 is a thermoplastic film including one or more selected from the group consisting of high density polyethylene (HDPE), low density polyethylene (LDPE), linear low density polyethylene (LLDPE), non-oriented cast polypropylene (CPP), oriented polypropylene (OPP), polyvinylidene chloride (PVDC), polyvinyl chloride (PVC), ethylene-vinyl acetate (EVA) copolymer, ethylene-vinyl alcohol (EVOH) copolymer, and combinations thereof, which are easy to perform heat welding. In order to provide a sufficient sealing property, the adhesive layer 40 may be formed to have a thickness of about 50 µm to about 80 µm.

As described above, by forming the outer skin material for a vacuum heat insulator including the outermost glass textile layer 10, the surface protective layer 30, the metal barrier layer 20 and the adhesive layer 40, barrier performance of the outer skin material for a vacuum heat insulator may be enhanced, and tear caused by external impact and flame retardancy of the surface of the outer skin material may be improved, and the outer skin material for a vacuum heat insulator may have the best air tightness and long-term durability.

Specifically, when the outer skin material for a vacuum heat insulator is used for high temperature usage, the outermost glass textile layer may absorb heat to improve vacuum retentivity in the vacuum heat insulator according to deterioration of the outer skin material. In addition, when the outer skin material for a vacuum heat insulator is used for construction usage, even though cement is attached to the surface of the outer skin material, occurrence of damage of the outer skin material caused by curing the cement may be minimized, and function of protecting the surface of the vacuum heat insulator may be enhanced.

Vacuum Heat Insulator

In another exemplary embodiment of the present invention, there is provided a vacuum heat insulator including: a glass fiber board having at least one layer and including 50 wt % to 90 wt % of fumed silica powder and 10 wt % to 50 wt % of glass fiber; and the outer skin material for a vacuum heat insulator including the lamination structure of an outermost glass textile layer, a surface protective layer, and an adhesive layer from the outside, in which the glass fiber board is inserted.

In addition, in still another exemplary embodiment of the present invention, there is provided a vacuum heat insulator including a glass fiber board having at least one layer and including 85 wt % to 100 wt % of glass fiber; a getter agent attached to or inserted in the glass fiber board; and the outer skin material for a vacuum heat insulator of claim 1, in which the glass fiber board is inserted.

Figure 4A:
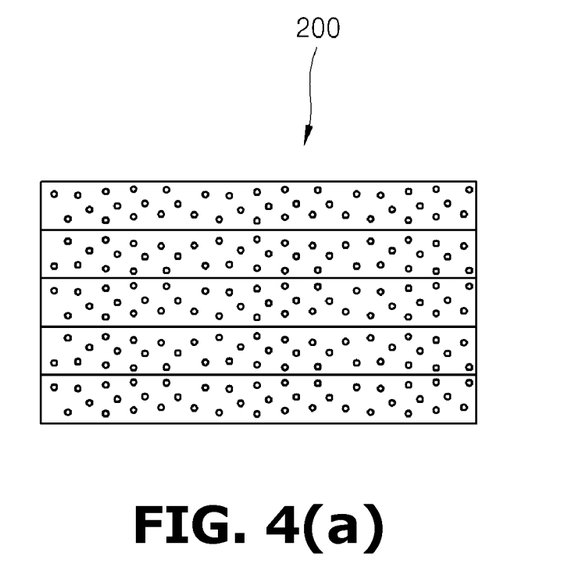
FIG. 4(a) and FIG. 4(b) are cross-sectional views each illustrating a glass fiber board of another exemplary embodiment of the present invention.
Figure 4B:
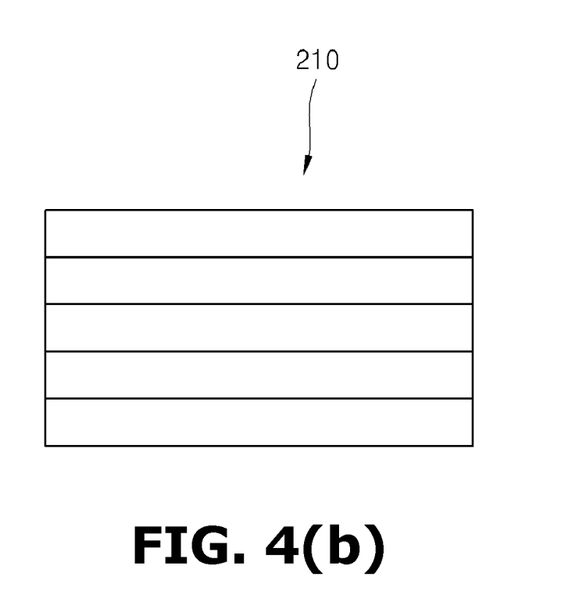

FIG. 4(*a*) and FIG. 4(*b*) are cross-sectional views illustrating the glass fiber boards of another exemplary embodiments of the present invention. Specifically, FIG. 4(*a*) illustrates the glass fiber board having at least one layer and including the fumed silica powder and the glass fiber, and FIG. 4(*b*) illustrates the glass fiber board having at least one layer and including a predetermined content of glass fiber.

The glass fiber board 200 in FIG. 4(*a*) may include the fumed silica powder and the glass fiber to be usable as a core material for a vacuum heat insulator. The glass fiber board refers to a board made by stirring fumed silica powder with a glass fiber used as a binder to induce physical combination, and applying heat and pressure. The glass fiber board may be formed in a single layer or in one or more multi-layers. By including the glass fiber board having at least one layer, heat insulation performance and long-term durability of the vacuum heat insulator may be improved.

The fumed silica means silicic acid anhydride made in a fume form, and is present in a powder form having large surface and composed of fine particles. By including the fumed silica powder at about 50 wt % to about 90 wt %, long-term continuation effect in view of heat insulation performance may be secured.

The glass fiber board may include the glass fiber while simultaneously including the fumed silica powder. The glass fiber board includes the glass fiber at about 10 wt % to about 50 wt % to have advantages in that the glass fiber is capable of physically binding with the fumed silica to form a structure, and being used as a core material for a vacuum heat insulator to improve heat insulation performance of the vacuum heat insulator.

In addition, regarding improvement of the heat insulation performance of the glass fiber board, other materials formed of silica-based porous materials or silicon oxide may be further added to the glass fiber board, in addition to the fumed silica powder and the glass fiber.

The glass fiber included in the glass fiber board may have a diameter of about 0.1 µm to about 20 µm. In forming the glass fiber board, the glass fiber board includes the glass fiber having a diameter of about 0.1 µm to about 20 µm to have advantages in that porosity of the glass fiber board may be increased to reduce initial heat conductivity, and pore size of the glass fiber board may be minimized to improve deterioration of long-term heat insulation performance.

The glass fiber board may have a pore size of about 15 µm to about 30 µm, and a porosity of about 80% to about 95%. The glass fiber board includes the fumed silica powder, and accordingly, pores between the powders may be formed. For example, the fumed silica powder itself may have a pore size of about 10 nm to about 60 nm, and a porosity due to the pore size of about 60% to about 85%. Accordingly, the glass fiber board may include the pore size and the porosity to reduce initial heat conductivity, thereby easily improving heat insulation performance.

The glass fiber board 210 in FIG. 4(b) may include the glass fiber at about 85 wt % to about 100 wt %. By including the glass fiber at the above-described range, heat conductivity of the vacuum heat insulator including the glass fiber board may be reduced, and the glass fiber having an average fiber diameter of about fpm to about 4 μm may be used.

The glass fiber board may be manufactured by a we method of dispersing the glass fiber in an inorganic binder (one or more of soluble sodium silicate, alumina sol, silica sol, and alumina phosphate) and manufacturing the dispersion product as a board. Specifically, the soluble sodium silicate may include water, silica powder, and sodium hydroxide.

Specifically, the glass fiber board 210 may be formed of silicon oxide of about 55% to about 70%, aluminum oxide of about 0.5% to about 5.0%, magnesium oxide of about 2.5% to about 4.0%, and calcium oxide of about 4.5% to about 12%, potassium oxide of about 0.1% to about 0.5%, and the like.

Figure 5:
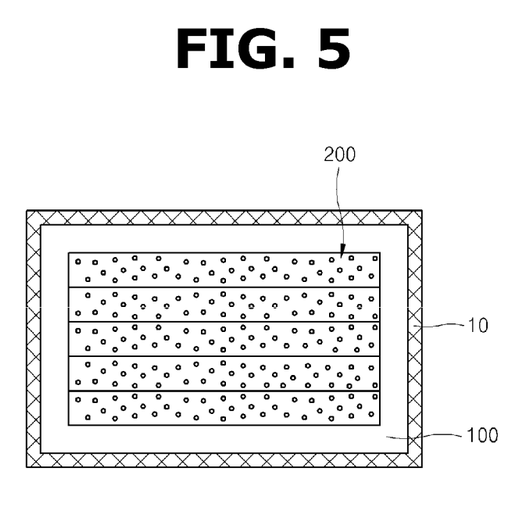
FIGS. 5 and 6 are cross-sectional views each illustrating a vacuum heat insulator of another exemplary embodiment of the present invention.
Figure 6:
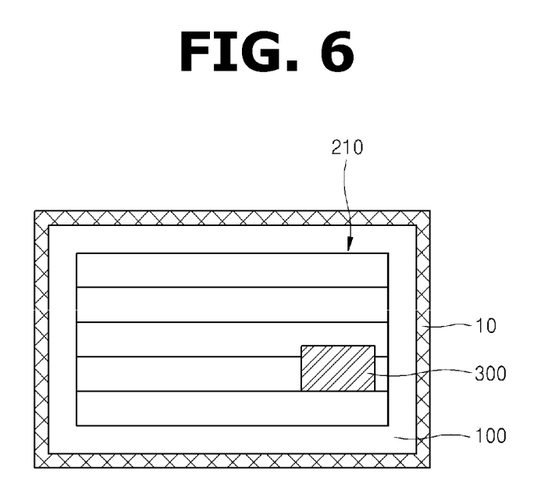

FIGS. 5 and 6 are cross-sectional views each illustrating the vacuum heat insulator of still another exemplary embodiment of the present invention. FIG. 5 illustrates the vacuum heat insulator in a state in which the glass fiber board 200 in FIG. 4(a) is sealed with the outer skin material 100.

The glass fiber board 200 in FIG. 4(a) may include the fumed silica powder, wherein the fumed silica powder itself may be performed as a getter agent absorbing moisture, and the like.

Accordingly, due to the glass fiber board 200, the vacuum heat insulator may minimize occurrence of gas and moisture in the outer skin material occurred by change in external temperature even though the vacuum heat insulator does not separately include the getter agent.

In addition, 6, FIG. 6 illustrates the vacuum heat insulator made by inserting the getter agent 300 into the glass fiber board 210 and sealing the glass fiber board by using the outer skin material 100.

The glass fiber board 210 in FIG. 4(b) is formed by including the glass fiber as a main component, and may include the getter agent attached to or inserted in the glass fiber board. Gas and moisture may occur in the outer skin material by change in external temperature, wherein the getter agent may be used to prevent the occurrence of gas and moisture.

The getter agent may include quicklime powder; and an alloy selected from the group consisting of Ba, Li, Zr, Co and combinations thereof. By including the quicklime powder, about 25% or more of moisture absorbing performance may be secured, and by including the alloy, adsorption effect of gas may be improved to minimize reduction of internal vacuum, thereby improving initial and long-term heat conductivities.

Specifically, the quicklime powder may have an amount of about 1 wt % to about 25 wt % based on total weight of the alloy. The getter agent may include the quicklime powder having the above-described range based on total weight of the alloy selected from the group consisting of Ba, Li, Zr, Co and combinations thereof, such that a problem of reduction of degree of vacuum due to moisture remaining in the vacuum heat insulator may be prevented, and further, an effect of improving heat insulation performance according to long-term reduction of degree of vacuum due to moisture and gas may be easily implemented.

The vacuum heat insulator may include at least one through-hole. The through-hole may be formed in the glass fiber board 200 in a thickness direction or may be formed in a heat welding part (not illustrated) of the outer skin material composed of only the outer skin material 100 for a vacuum heat insulator in a thickness direction, that is, the through hole may be formed in the heat welding part of the outer skin material including the glass fiber board or in the heat welding part of the outer skin material without including the glass fiber board. Here, the through-hole may have a shape of polygons, circles, ellipses and combinations thereof.

Hereinafter, exemplary embodiments of the present invention are described. Meanwhile, Examples to be described below are merely provided for specifically exemplifying or explaining the present invention, and accordingly, the present invention is not limited to the following Examples.

EXAMPLES AND COMPARATIVE EXAMPLES

Example 1

First, a glass fiber board having three layers was manufactured by using 50 wt % of fumed silica powder having a pore size of 60 nm and a porosity of 80%, and 50 wt % of a glass fiber as a binder.

Next, glass filaments each having a thickness of 5 denier were manufactured by heat melt spinning E-glass having a diameter of 10 μm, and several strands of the glass filaments were twisted to manufacture a glass fiber yarn. Then, the glass fiber yarn was weaved to prepare a continuous glass fiber fabric, thereby manufacturing an outermost glass textile layer. A polyvinylidene chloride (PVDC)/polyethylate terephthalate (PET) film of 12 μm and a nylon film of 25 μm as a surface protective layer, an aluminum foil of 7 μm, and a linear low density polyethylene (LLDPE) film of 50 μm as an adhesive layer were stacked below the outermost glass textile layer to form an outer skin material. The outermost glass textile layer and the surface protective layer were adhered to each other by using a polyurethane-based resin containing about 10 wt % of antimony trioxide.

Then, the glass fiber board was inserted into the outer skin material and sealed in a state of degree of vacuum (10 Pa) to manufacture a vacuum heat insulator.

Example 2

A vacuum heat insulator was manufactured by the same method as Example 1 above except for forming an outer skin material by stacking an aluminum foil of 7 μm, a polyvinylidene chloride (PVDC)/polyethylene terephthalate film (PET) of 12 μm and a nylon film of 25 μm as a surface protective layer, and a linear low density polyethylene (LLDPE) film of 50 μm as an adhesive layer below the outermost glass textile layer.

The outermost glass textile layer and the aluminum foil were adhered to each other by using a polyester resin containing 30 wt % of aluminum hydroxide.

Example 3

A vacuum heat insulator was manufactured by the same method as Example 1 above except for using a glass paper as the outermost glass textile layer.

Example 4

A glass fiber board having three layers was manufactured by dispersing about 98 wt % of a glass fiber having an average diameter of 4 μm to 6 μm in an inorganic binder. Next, glass filaments each having a thickness of 5 denier were manufactured by heat melt spinning E-glass having a diameter of 10 μm, and several strands of the glass filaments were twisted to manufacture a glass fiber yarn. Then, the glass fiber yarn was weaved to prepare a continuous glass fiber fabric, thereby manufacturing an outermost glass textile layer. A polyvinylidene chloride (PVDC)/polyethylene terephthalate (PET) film of 12 μm and a nylon film of 25 μm as a surface protective layer, an aluminum foil of 7 μm, and a linear low density polyethylene (LLDPE) film of 50 μm as an adhesive layer were stacked below the outermost glass textile layer to form an outer skin material. The outermost glass textile layer and the surface protective layer were adhered to each other by using a polyurethane-based resin containing about 10 wt % of antimony trioxide.

Next, a getter agent was prepared by containing quicklime (calcium oxide: CaO) powder having purity of 95%, the quicklime powder having an amount of 25 wt % based on total weight of an alloy of Ba and Li, and the getter agent was inserted into the glass fiber board, and then the glass fiber board was inserted into the outer skin material and sealed in a state of degree of vacuum (10 Pa) to manufacture a vacuum heat insulator.

Comparative Example 1

A vacuum heat insulator was manufactured by the same as Example 1 above except for not including the outermost glass textile layer.

Comparative Example 2

A vacuum heat insulator was manufactured by the same as Example 1 above except for dispersing a glass fiber having a diameter of about 0.1 μm to about 15 μm in an inorganic binder (water glass) at the time of manufacturing the glass fiber board, and stacking 30 layers of the glass fiber board having a thickness of 5 mm.

Comparative Example 3

A vacuum heat insulator was manufactured by the same as Example 2 above except for using a getter agent prepared by putting 25 g of quicklime (calcium oxide: CaO) having purity of 95% in a pouch.

Experimental Example 1

Test of Heat Resistance and Flame Retardancy of Vacuum Heat Insulator

1) Lighter Flame Test: Each extinguishing time on lighter flame tests of the outer skin materials for the vacuum heat insulator of Examples 1 to 3 and Comparative Example 1 was measured by UL 94-V (vertical burning test).

2) Horizontal Burning Test: Each burning rate of the outer skin materials for the vacuum heat insulator of Examples 1 to 3 and Comparative Example 1 was measured by UL 94-HB.

TABLE 1

|  | Extinguishing Time (sec) | Burning Rate (mm/min) |
|---|---|---|
| Example 1 | 8 | <40 mm/min |
| Example 2 | 3 | <40 mm/min |
| Example 3 | 10 | <40 mm/min |
| Example 4 | 9 | <40 mm/min |
| Comparative Example 1 | 50 | 48 mm/min |

Referring to Table 1 above, in Examples 1, 2 and 4 each including the outermost glass textile layer formed of the glass fiber fabric, and in Example 3 including the glass paper as the outermost glass textile layer, extinguishing time was measured as being within 10 seconds, and burning rate was measured as 40 mm/min or less.

Accordingly, it could be appreciated that the vacuum heat insulators of Examples 1 to 4 had excellent heat resistance and flame retardancy as compared to those of Comparative Example 1 in which extinguishing time was measured as being greater than 10 seconds, and burning rate was measured as being greater than 40 mm/min, and the outermost glass textile layer was not included.

Experimental Example 2

Test of Heat Conductivity of Vacuum Heat Insulator

Each heat conductivity was measured by putting the vacuum heat insulators of Examples and Comparative Examples into constant temperature chambers of 85° C. and maintaining the vacuum heat insulators for 3 months, wherein a heat conductivity meter HC-074-200 (EKO Corporation) was used to measure heat conductivity.

TABLE 2

|  | Heat Conductivity (mW/Mk) | | |
|---|---|---|---|
|  | First Month | Second Month | Third Month |
| Example 1 | 4.56 | 4.60 | 4.64 |
| Example 4 | 4.62 | 4.71 | 4.80 |
| Comparative Example 2 | 4.90 | 5.31 | 5.73 |
| Comparative Example 3 | 5.12 | 5.63 | 6.17 |

Referring to Table 2 above, Example 1 including the glass fiber board formed of the fumed silica powder and the glass fiber had lower heat conductivity than that of Comparative Example 2 including conventional glass fiber board.

In addition, even though Example 4 included the conventional glass fiber board, Example 4 maintained low heat conductivity by attaching the getter agent including the alloy to the inside of the glass fiber board, and accordingly, Example 4 had lower heat conductivity than that of Comparative Example 3 using the conventional getter agent. Therefore, it could be appreciated that the vacuum heat insulators of Examples 1 to 4 had more excellent heat insulation performance than those of Comparative Examples 2 and 3.

Further, even though time passed from 1 month to 3 months, heat conductivities of Examples 1 and 4 were continuously lower than those of Comparative Examples 2 and 3, and accordingly, it could be appreciated that the vacuum heat insulators of Examples 1 and 4 also had excellent long-term durability.

The invention claimed is:

1. An outer skin material for a vacuum heat insulator comprising:
an outermost glass textile layer, wherein the outermost glass textile layer comprises a glass paper;
a metal barrier layer;
a surface protective layer; and
an adhesive layer,
wherein the outermost glass textile layer, the metal barrier layer, the surface protective layer, and the adhesive layer are arranged in this order and form a laminated structure, and
wherein the outermost glass textile layer and the metal barrier layer are adhered to each other by a polyester resin,
wherein the polyester resin comprises at least one selected from the group consisting of a phosphorus compound, a nitrogen compound, a boron compound, antimony trioxide, aluminum hydroxide and magnesium hydroxide.

2. The outer skin material for a vacuum heat insulator of claim 1, wherein the outermost glass textile layer includes a glass fiber having a diameter of 4 μm to 40 μm.

3. The outer skin material for a vacuum heat insulator of claim 2, wherein the glass fiber is an electrical glass (E-glass), a chemical glass (C-glass), or an electrical-corrosion resistant glass (E-CR glass).

4. The outer skin material for a vacuum heat insulator of claim 1, wherein the outermost glass textile layer further comprises a glass fiber yarn formed by twisting glass filaments prepared by heat melt-spinning glass fibers, or a glass fiber fabric formed by weaving the glass fiber yarns, or a glass fiber mat formed by connecting glass fiber fabrics through the glass fiber yarn.

5. The outer skin material for a vacuum heat insulator of claim 1, wherein the outermost glass textile layer has a fabric structure of plain weave, twill weave, satin weave, leon plain, or imitation leno.

6. The outer skin material for a vacuum heat insulator of claim 1, wherein the outermost glass textile layer has a thickness of 0.1 mm to 3 mm.

7. The outer skin material of claim 1, wherein the at least one selected from the group consisting of the phosphorus compound, the nitrogen compound, the boron compound, antimony trioxide, aluminum hydroxide and magnesium hydroxide is present in an amount of 3 wt % to 60 wt % in the polyester resin.

8. The outer skin material for a vacuum heat insulator of claim 1, wherein the surface protective layer includes a lamination structure of a polyethylene terephthalate film and a nylon film.

9. The outer skin material for a vacuum heat insulator of claim 8, wherein the polyethylene terephthalate film is coated with a vinyl-based resin on a side facing the outermost glass textile layer.

10. The outer skin material for a vacuum heat insulator of claim 9, wherein the vinyl-based resin is one or more selected from the group consisting of polyvinyl chloride (PVC), polyvinyl acetate (PVA), polyvinyl alcohol (PVAL), polyvinyl butyral (PVB), polyvinylidene chloride (PVDC), and combinations thereof.

11. The outer skin material for a vacuum heat insulator of claim 1, wherein the adhesive layer is one or more selected from the group consisting of high density polyethylene (HDPE), low density polyethylene (LDPE), linear low density polyethylene (LLDPE), non-oriented cast polypropylene (CPP), oriented polypropylene (OPP), polyvinylidene chloride (PVDC), polyvinyl chloride (PVC), ethylene-vinyl acetate (EVA) copolymer, ethylene-vinyl alcohol (EVOH) copolymer, and combinations thereof.

12. A vacuum heat insulator comprising:
a glass fiber board having at least one layer and including 50 wt % to 90 wt % of fumed silica powder and 10 wt % to 50 wt % of glass fiber; and
the outer skin material for a vacuum heat insulator of claim 1, in which the glass fiber board is inserted.

13. The vacuum heat insulator of claim 12, wherein the glass fiber of the glass fiber board has a diameter of 0.1 μm to 20 μm, and the glass fiber board has a pore size of 15 μm to 30 μm and a porosity of 80% to 95%.

14. A vacuum heat insulator comprising:
a glass fiber board having at least one layer and including 85 wt % to 100 wt % of glass fiber;
a getter agent attached to or inserted in the glass fiber board; and
the outer skin material for a vacuum heat insulator of claim 1, in which the glass fiber board is inserted.

15. The vacuum heat insulator of claim 14, wherein the getter agent includes quicklime (calcium oxide: CaO) powder; and
an alloy selected from the group consisting of Ba, Li, Zr, Co and combinations thereof,
wherein the quicklime powder has an amount of 1 wt % to 25 wt % based on total weight of the alloy.

16. The vacuum heat insulator of claim 12, wherein the vacuum heat insulator includes at least one through-hole.

17. The vacuum heat insulator of claim 14, wherein the vacuum heat insulator includes at least one through-hole.

* * * * *